UNITED STATES PATENT OFFICE.

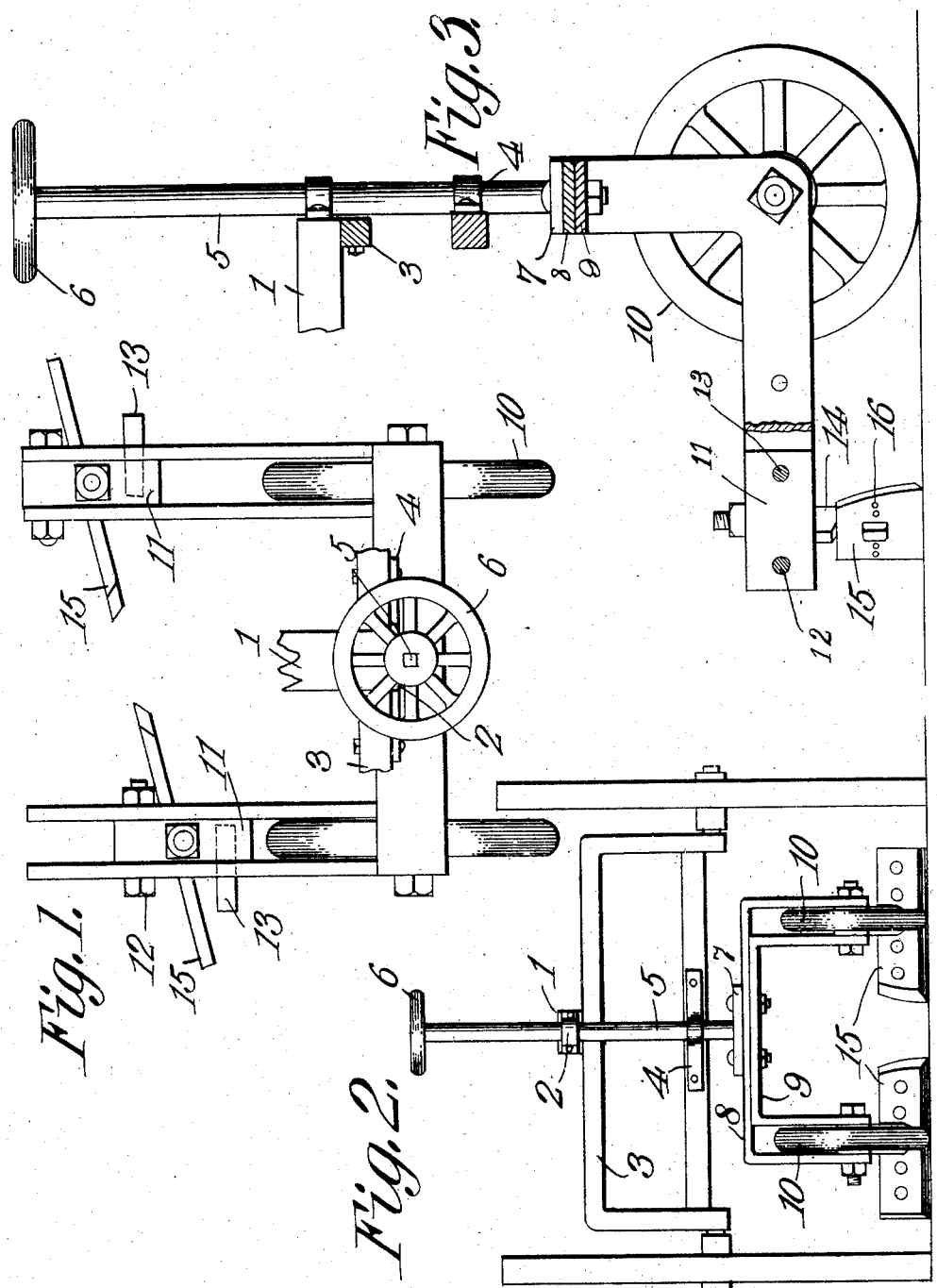

DANIEL A. CABLE, OF BONAMI, LOUISIANA.

COTTON-CHOPPER.

No. 854,269. Specification of Letters Patent. Patented May 21, 1907.

Application filed October 1, 1906. Serial No. 336,895.

*To all whom it may concern:*

Be it known that I, DANIEL A. CABLE, a citizen of the United States, residing at Bonami, in the parish of Calcasieu and State of Louisiana, have invented a new and useful Cotton-Chopper, of which the following is a specification.

This invention has relation to cotton choppers or thinning plows and it consists in the novel construction and arrangement of its parts as hereinafter shown and described.

The object of the invention is to provide a simple and durable means for thinning cotton and other plants. It consists primarily of an arch member which is adapted to straddle the row of plants and which is attached to the lower end of a shaft, the upper end of which is provided with a hand wheel. The said shaft is suitably journaled to the axle and beam of the implement. The said arch member is provided with horizontal portions to which are adjustably attached cutting blades, the said blades being capable of lateral adjustment also. The said arch member is mounted upon a pair of ground wheels and the said wheels and cutting blades operate upon opposite sides of the row of plants.

In the accompanying drawings,—Figure 1 is a top plan view of the cotton thinning implement. Fig. 2 is a rear elevation of the same, and Fig. 3 is a vertical sectional view of the same.

The rear end of the beam 1 is provided with the bearing 2, and the side of the axle 3 is provided with a bearing 4. The shaft 5 is journaled in the said bearings 2 and 4 and may slide longitudinally therein. The upper end of the said shaft 5 is provided with a hand wheel 6, and the arch member 7 is rigidly bolted to the lower end of the said shaft 5.

The arch member 7 is made up of two metallic pieces 8 and 9. Said pieces are fixed with relation to each other and are parallel, the piece 9 is located under and within the piece 8. The said pieces are spaced apart at their vertical sides and the ground wheels 10 are journaled between the spaced portions of the said pieces. The lower ends of the pieces 8 and 9 are horizontally disposed and the blocks 11 are located between the said horizontal portion of the said pieces and are adapted to be adjusted longitudinally thereof. The bolt 12 serves as a securing means for the block 11 and the pin 13 passes through perforations in the horizontal portions of the pieces 8 and 9 and also through the block 11. The pin 13 is preferably of wood or other comparatively fragile material.

The standards 14 depend from the blocks 11 and the blades 15 are bolted to the lower ends of the said standards, the said blades having a series of perforations whereby they may be adjusted laterally. The arch member 7 is adapted to straddle the rows of plants and the operator by turning the shaft 5 works the blades 15 in and out among the plants as the implement passes over the ground, and thus the objectionable plants are cut out.

In addition to having the hand wheel 6 for the purpose of turning the shaft the operator may rest his feet upon the top of the arch member 7 at opposite sides of the shaft 5 and thus use his feet partially or entirely for moving the blades.

Should the blades strike an obstruction such as a root or rock, the pins 13 will snap and thus the blades may swing to the rear, the blocks 11 turning upon the bolts 12 and pass over the obstruction, without throwing the implement out of its line of travel.

Having described my invention what I claim as new and desire to secure by Letters-Patent is:—

1. A cutting implement comprising a shaft journaled for rotation, an arch member carried by the shaft, ground wheels journaled to the arch member, and cutting blades attached to the arch member in advance of the ground wheels.

2. A cutting implement comprising a journaled shaft, an arch member attached thereto, ground wheels supporting said arch member, said arch member having horizontally-disposed portions, and cutting blades mounted upon said horizontal portions and being adjustable longitudinally thereof.

3. A cutting implement comprising a journaled shaft, an arch member attached thereto, ground wheels supporting said arch member, said arch member having horizontal portions, blocks adjustably attached to said horizontal portions, and laterally adjustable cutting blades carried by said blocks.

In testimony that I claim the foregoing as my own, I have hereto affixed my signature in the presence of two witnesses:

DANIEL A. CABLE.

Witnesses:
C. D. KENESSON,
C. A. YARBORO.